S. COMFORT.
Harvester Rake.
No. 16,307.
Patented Dec. 23, 1856.
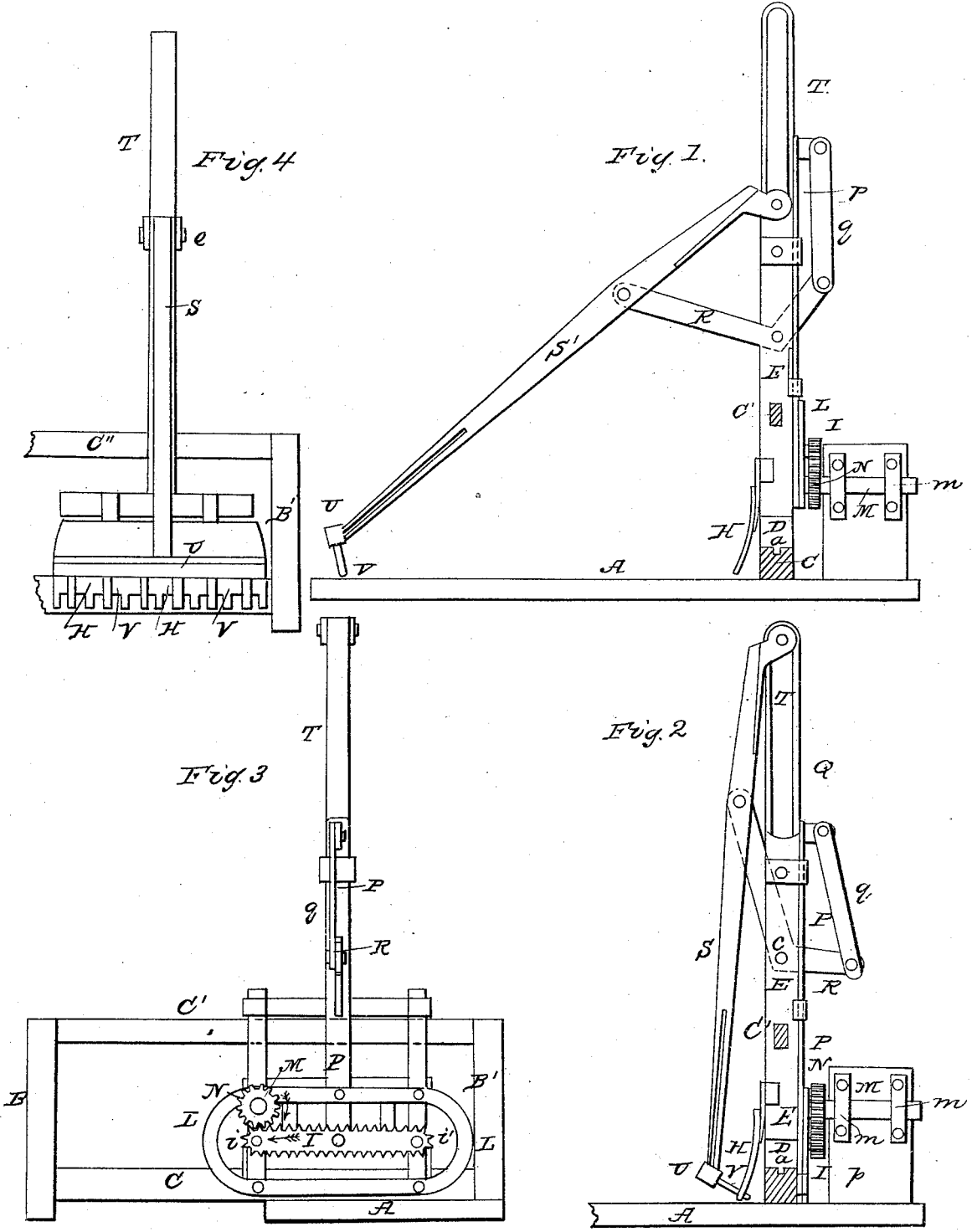

UNITED STATES PATENT OFFICE.

SAMUEL COMFORT, JR., OF MORRISVILLE, PENNSYLVANIA, ASSIGNOR TO E. S. RENWICK, OF NEW YORK, N. Y.

IMPROVEMENT IN AUTOMATIC RAKES FOR HARVESTERS.

Specification forming part of Letters Patent No. 16,307, dated December 23, 1856.

*To all whom it may concern:*

Be it known that I, SAMUEL COMFORT, Jr., of Morrisville, in the county of Bucks and State of Pennsylvania, have invented certain new and useful Improvements in Automatic Rakes for Harvesting-Machines, of which the following is a full, clear, and exact description, reference being had to the accompanying drawings, which form a part of this specification, and in which—

Figure 1 represents an elevation of the rear side of my automatic rake mounted upon a traversing carriage, with the rake extended out toward the divider side of the platform for receiving the cut grain, and with the hinder post of a traverse-frame, which supports and guides a traversing carriage which carries the rake, removed. Fig. 2 is a similar elevation with the rake drawn to its full extent toward the stubble side of the platform and near to the traverse-frame to grip the gavel of grain which it has just swept off the platform in traversing the same from the divider to the stubble side. Fig. 3 is an end elevation of the apparatus, showing the back of the rake-carriage and the mechanism for operating the same; and Fig. 4 is an elevation of the reverse or front of certain of the parts shown in Fig. 3.

The object of my invention is to gather together at intervals the cut grain which falls upon the platform of a harvesting-machine, to compress it into a compact gavel, to remove the gavel thus gathered and compressed from the platform, and to drop it in the track of the harvesting-machine in a convenient position for binding.

The first part of my invention consists in actuating a rake by means of a lever working in connection with a guide, by the action of which the rake-handle is raised and depressed in such proportion to the movement of the rake-head over the platform that the rake-teeth may be caused to glide over the platform in directions parallel to the surface thereof, whether the same be plane or curved.

The second part of my invention consists in equalizing the draft of a self-raking harvesting-machine by counterbalancing the force expended in gathering the grain into a gavel in part by the descending weight of the mechanism by which the rake is operated.

The third part of my invention consists in combining the rake and the mechanism by which it is moved to and fro over the platform with a traversing carriage moving transversely to the platform, so that the carriage and rake are carried transversely in a straight line off the platform, and with them the gavel of grain which has been collected and compressed, are held behind the platform until the gavel has been dropped and the rake again extended toward the divider end of the machine, and are then carried forward again over the platform to gather another gavel of grain.

The fourth part of my invention consists in carrying the gavel of grain collected by the rake backward from the platform in the direction opposite to that in which the harvesting-machine is progressing, while the rake is opening to drop the gavel, so that the latter, being at the time almost or quite without forward motion with respect to the ground, falls from the rake without scattering, and is thus left in a good condition for binding.

The fifth part of my invention consists in deriving the intermittent reciprocating movement of the rake in the direction of the length of the platform and the intermittent reciprocating movement of the rake-carriage transversely to the length of the platform from the same revolving shaft by means of an endless quadrilateral rack driven by a pinion on the revolving shaft and acting in combination with vertical and horizontal guides, the former of these guides for the rake and the latter for the carriage.

The accompanying drawings do not show all the parts of a harvesting-machine, but only such as are necessary to represent an apparatus embodying the principles of my invention, which may be applied to most of the various kinds of harvesting-machines having a platform upon which the grain falls as it is cut.

At that end of the platform A which is next to the driving-wheel I locate a traverse-frame to control and guide the rake-carriage. This traverse-frame is composed in this instance of two posts, B B', and two horizontal bars, C C', and it projects a sufficient distance beyond the rear edge of the platform to permit the grain to be carried clear of the platform before it is dropped.

The carriage is composed mainly of an upright post, E, and a horizontal foot, D. The latter is fitted with a tongue, $a$, which moves in a longitudinal groove formed in the upper side of the lower horizontal bar, C, of the traverse-frame, and the upright post E of the carriage has a mortise through it that fits loosely on the upper horizontal bar, C', of the traverse-frame to guide it and hold it upright as it moves back and forth. Under this arrangement the carriage is free to move to and fro in a direction transverse to the length of the platform, but is held in an upright position and prevented from rising or falling.

The upright post E of the carriage at its upper extremity carries a slotted vertical guide, T, in which a friction-roller runs, whose axle $e$ is connected with the upper end of the rake-handle S. The lower end of this rake-handle carries a rake-head, U, having suitable teeth, V, for gathering the grain. The rake-handle is slotted at a point intermediate between its upper extremity and the rake-head to receive the end of a bent lever, R, which is pivoted in this slot, and extends through a mortise in the upright post of the carriage, where it is secured by a pivot, $c$, upon which it turns as a fulcrum. The end of the bent lever which projects through the upright carriage-post opposite to the rake is connected by a link, $q$, with the upper extremity of an upright bar, P, which slides upon the adjacent face of the carriage. The lower part of this sliding bar is secured to an endless quadrilateral rack, I, whose teeth gear into those of a pinion, N, on a revolving shaft, M. The rack has an upper and a lower set of teeth, which in this instance are parallel to each other and to the horizontal bars of the traverse-frame, and at their adjacent ends these two parallel series of teeth are connected in this example by two other series of teeth arranged in semicircular lines $i$ $i'$. The rack is surrounded by a guard-rail, L, which is parallel to the pitch-line of the teeth.

The projecting extremity of the shaft of the pinion N, which gears into the rack, runs on the edge of this rail L, to keep the teeth of the rack and pinion in gear with each other.

In order to prevent the teeth of the pinion and rack from engaging too deeply in gear, a rim should be secured to the rack at the pitch-line of its teeth, and a corresponding smooth rim should be secured to the pinion at the pitch-line of its teeth, so that the rim of the latter, rolling upon the rim of the rack, would limit the distance to which the teeth would engage.

The upright bar P, the rack I, and the guard L form a frame, which slides up and down in guides upon the adjacent face of the carriage. The opposite face of the carriage, which is adjacent to the rake, has a concave plate, H, secured to it, against which the gavel of grain is compressed by the rake.

When a harvesting-machine with this apparatus applied to it is in operation the pinion-shaft is caused to revole in the direction of the arrow seen in Fig. 3 by connecting it with the driving-wheel of the machine by means of suitable gearing and shafts.

As the pinion revolves its teeth traverse those of the endless rack and as the pinion-shaft is maintained in its position upon the frame of the machine by the boxes $m$, in which its journals revolve, the rack is caused to move round the pinion in an elongated circuit. While the teeth of the pinion are traversing the upper teeth of the rack the latter moves backward across the platform and carries with it the rake-carriage, as the guides, which permit the rake to slide up and down and connect it with the carriage, do not permit a horizontal movement of the rack independent of the carriage. As the pinion-teeth begin to act upon the forward curved line of rack-teeth, $i'$ the rack is lifted and carries with it the upright bar P, which, being connected by the link $q$ with the bent lever R, turns the latter upon its fulcrum, and moves the middle of the rake-handle from the upright post E of the carriage, the rake-head toward the divider extremity of the machine, and the upper end of the rake-handle down the slotted guide toward the head of the post. When the pinion, in its rotation, after traversing the curve, begins to act upon the lower side of the rack it causes the carriage, with the extended rake, to move forward toward the front of the platform. When the pinion, after traversing the lower side of the rack begins to act upon the hinder semicircular line of teeth it depresses the rack, turns the bent lever back again, and causes the rake to move over the entire length of the platform, sweeping off the grain and compressing it against the plate H, secured to the carriage, to make the gavel compact. In the backward transverse movement of the carriage, which now begins, the gavel of grain thus gathered and compressed is carried backward from the platform, being held by the rake-teeth until the rake-head U again begins to move outward from the plate H, when the gavel is dropped.

From the foregoing description it will be seen that the upper end of the rake-handle moves upward and downward as the rake-head moves inward and outward, and by giving the guide T a suitable form the rake-teeth may be made to move in straight or curved lines along the platform, their points gliding over it at a uniform distance from its surface throughout its whole extent.

In the apparatus herein described, and represented in the accompanying drawings, the relative lengths of the longer arm of the bent lever and of the parts of the rake-handle above and below the pivot of the lever are such that when the guide is straight and perpendicular to the platform the rake-teeth will glide in substantially straight lines over a platform having a plane surface. If these relative lengths are altered, and the platform remain the same, the form of the guide should also be changed to correspond. Thus, if the lengths should be made such that the rake-teeth with a straight guide would describe a curved line, with its convex side next to the platform, the guide should be correspondingly curved, with its concave side next to the rake-handle, and vice versa.

In harvesters fitted with automatic-raking apparatus a considerable force must be exerted while the rake is gathering and compressing the grain. On the other hand, a comparatively small amount of force is required to extend the rake toward the divider end of the machine. As the force required is obtained from the revolution of the driving-wheel, the draft of the machine is very unequal.

The object of one part of my invention is to equalize the draft of the machine.

It will be seen that the rack and its appurtenances ascend as the rake is extended out and descend when the rake is drawn in to rake the grain. During its ascent the draft of the machine is increased by the amount of force required to raise the weight of the rack and its appurtenances, while during their descent their weight assists in moving the rake and gathering the grain, thus diminishing the draft of the machine at the time by the amount of force exerted by the descending weight.

In building machines upon this plan I propose to make the weight of the rack and its appurtenances, as near as may be, such that about half as much force is required to raise them as is required to rake the grain. By thus loading the rake the force expended while raking grain and while extending the rake will be equalized, and the draft of the machine will be equalized in a corresponding degree.

The advantage of removing the gavel of grain in a straight line from the platform is obvious, for by this plan of discharge it has to be carried through a less distance, and can therefore be deposited on the ground in less time and with less expenditure of power than would be required if it were carried off in a more circuitous direction to the point of discharge. Besides, this mode of operation evidently requires but a small amount of room for the mechanism, and enables the constructor to locate the parts in such manner that the grain falling upon the platform while the gavel is being removed therefrom is not disturbed.

On a careful examination of the operation of the mechanism by which the rake and the carriage are operated it will be seen that the backward movement of the carriage continues during the opening of the rake to drop the gavel, for at this moment the pinion-teeth are traversing obliquely up toward the middle of one end of the rack, imparting at the same time a backward movement to the carriage, rake, and gavel. The gavel of grain being thus carried backward from the machine as the machine moves forward, and the backward movement of the gavel at this time being about equal to the forward movement of the machine, the gavel has no motion over the ground, and is therefore deposited in a compact mass instead of being spread out or scattered, as it would be if it were in this, as in other machines, dropped while moving forward. This part of my invention is of great advantage in reference to the binding of the grain, which is greatly facilitated by laying the gavel in a compact mass.

In order to operate both the rake and the carriage, it is necessary that two intermittent reciprocating motions at right angles to each other should be obtained. In a harvesting-machine all the motions required to drive the various operating parts of the machine are obtained from the driving-wheel, which revolves continuously in one direction. Hence it is desirable to derive the motions required in raking from a continuously-revolving shaft, and, for simplicity, all the motions should be obtained from the same shaft. This desideratum is obtained in my apparatus by the endless quadrilateral rack and pinion acting in combination with the horizontal guides or ways, which limit the movement of the carriage, and with the guides which control the movement of the rack and its appurtenances in ascending and descending, so that the double intermittent reciprocating movements are both derived from the same continuously-revolving pinion-shaft.

The relative periods of time occupied in moving the rake in and out and in moving the carriage backward and forward may be adjusted by varying the relative lengths and directions of the several sides of the quadrilateral rack. Thus, if the time required to move the rake in and out is to be made more nearly equal to that required to move the carriage backward and forward the ends of the rack must be made longer, so as to contain a greater number of teeth. In this case the shorter arm of the bent lever must also be made longer to maintain the same sweep in the rake-teeth, and if the whole operation of the raking apparatus is to be accomplished in the same space of time as before such alterations were made, then the pinion must be enlarged or must be driven at a faster rate. Again, if for the purpose of economizing power it be desirable to grasp the gavel with barely sufficient force to carry it back to the point at which it is to be discharged, and then give it a sudden and forcible squeeze just before dropping it, this, it is obvious, can be accomplished by depressing slightly all that portion of the rack and the guide-rails employed to carry the gavel out to near the point of discharging it and correspondingly elevating that part of the rack and the guard-rails on which the pinion is acting immediately before the dropping of the gavel, as the raising of the rack lessens and its depression increases the pressure or grasp upon the gavel. These and other changes will readily occur to the skillful mechanic who may be required to adapt my invention to the varying circumstances in which it may be desired to use it.

Having thus described my invention and some of the modifications of which it is susceptible, what I claim as new therein, and desire to secure by Letters Patent, is—

1. The combination of the rake-handle, the guide which its upper end traverses, and the lever to vibrate the rake in and out, when arranged for joint operation, substantially as herein set forth.

2. The counterloading of the rake for the purpose of rendering the draft of the machine more equable, substantially as herein set forth.

3. The combination of the rake with the mechanism for moving the same to and fro over the platform with a traversing carriage, substantially as herein set forth.

4. The method of discharging the gavel before being bound by dropping it from between the rake-teeth V and the plate H while the machine is in motion, as if it were standing still, by neutralizing the forward motion derived by the gavel from the machine by its backward motion, derived from the rake, substantially as herein set forth.

5. The combination of the rack and pinion, or the equivalent thereof, with the rake, substantially as herein set forth, whereby the motions are generated for traversing the rake, first along the platform to gather the grain into a gavel, and then across the platform to discharge the gavel.

In testimony whereof I have hereunto subscribed my name.

SAMUEL COMFORT, JR.

In presence of—
AARON IVINS,
GEO. COMFORT.